(12) United States Patent
Feltman

(10) Patent No.: US 10,519,655 B2
(45) Date of Patent: Dec. 31, 2019

(54) PARTITION CLIP

(71) Applicant: Jeffrey L. Feltman, South Windsor, CT (US)

(72) Inventor: Jeffrey L. Feltman, South Windsor, CT (US)

( * ) Notice: Subject to any disclaimer, the term of this patent is extended or adjusted under 35 U.S.C. 154(b) by 0 days.

(21) Appl. No.: 15/892,778

(22) Filed: Feb. 9, 2018

(65) Prior Publication Data

US 2018/0238051 A1 Aug. 23, 2018

Related U.S. Application Data

(60) Provisional application No. 62/461,959, filed on Feb. 22, 2017.

(51) Int. Cl.
*E04B 9/00* (2006.01)
*F16B 2/24* (2006.01)
*E04B 9/06* (2006.01)
*E04B 1/41* (2006.01)
*E04B 9/12* (2006.01)
*E04B 1/38* (2006.01)
*E04B 9/22* (2006.01)
*F16B 7/04* (2006.01)
*F16B 21/02* (2006.01)
*F16B 9/00* (2006.01)

(52) U.S. Cl.
CPC ............... *E04B 9/008* (2013.01); *E04B 1/40* (2013.01); *E04B 9/064* (2013.01); *E04B 9/067* (2013.01); *E04B 9/12* (2013.01); *F16B 2/245* (2013.01); *E04B 9/225* (2013.01); *E04B 2001/405* (2013.01); *F16B 7/0433* (2013.01); *F16B 9/07* (2018.08); *F16B 21/02* (2013.01)

(58) Field of Classification Search
CPC . E04B 9/008; E04B 9/064; E04B 9/12; E04B 9/067; E04B 1/40; E04B 9/225; E04B 2001/405; F16B 2/245; F16B 21/02; F16B 7/0433; F16B 9/07
See application file for complete search history.

(56) References Cited

U.S. PATENT DOCUMENTS

| | | | | |
|---|---|---|---|---|
| 2,990,037 A | * | 6/1961 | Fowles | E04B 2/825 211/182 |
| 3,363,377 A | * | 1/1968 | Beckman | E04B 2/789 52/275 |
| 3,387,872 A | * | 6/1968 | Lovullo | E04B 9/005 52/463 |
| 3,589,660 A | * | 6/1971 | Dunckel | F21V 21/02 248/343 |
| 3,748,815 A | * | 7/1973 | Parker | E04B 1/944 24/336 |
| 3,780,973 A | * | 12/1973 | Dalton, Jr. | E04B 9/006 248/228.8 |

(Continued)

*Primary Examiner* — Rodney Mintz
(74) *Attorney, Agent, or Firm* — Alix, Yale & Ristas, LLP

(57) ABSTRACT

A universal partition clip is formed from a single piece of sheet metal and is adapted to be efficiently mounted to the underside of a T-bar flange. The clip comprises a bottom panel of generally uniform width and a pair of parallel side panels with a pair of generally coplanar lips spaced above the bottom panel. Integral resilient tabs are spaced above the bottom panel and have portions slightly above the lips. The tabs and lips cooperate to mount the clip to the flange portion of the T-bar member.

13 Claims, 4 Drawing Sheets

(56) References Cited

U.S. PATENT DOCUMENTS

| | | | | | |
|---|---|---|---|---|---|
| 3,962,840 | A | * | 6/1976 | Nelsson | E04B 2/7457 52/281 |
| 4,705,255 | A | * | 11/1987 | Reed, Jr. | E04B 9/006 248/317 |
| 4,838,002 | A | * | 6/1989 | Dajnko | E04B 9/008 52/238.1 |
| 5,245,811 | A | * | 9/1993 | Knorr | E04B 2/7409 403/382 |
| 5,355,646 | A | * | 10/1994 | Bischel | E04B 9/16 24/563 |
| 5,609,007 | A | * | 3/1997 | Eichner | E04B 9/064 52/506.07 |
| 6,067,691 | A | * | 5/2000 | Feltman | E04B 1/944 24/295 |
| 6,408,589 | B1 | * | 6/2002 | Bousquet | E04B 1/944 24/295 |
| 6,625,941 | B2 | * | 9/2003 | Shaw | E04F 13/0864 52/211 |
| 6,637,172 | B2 | * | 10/2003 | Bousquet | E04B 1/944 24/295 |
| 7,624,549 | B2 | * | 12/2009 | Kopish | E04B 2/82 52/242 |
| 8,132,383 | B1 | * | 3/2012 | Herrmann | E04B 1/944 52/489.1 |
| 8,549,810 | B1 | * | 10/2013 | Norton | E04B 9/245 52/506.06 |
| 8,555,593 | B2 | * | 10/2013 | Ramos | E04B 1/944 52/489.1 |
| 2009/0049766 | A1 | * | 2/2009 | Kopish | E04B 2/82 52/167.1 |
| 2014/0338160 | A1 | * | 11/2014 | Chien | F16B 2/245 24/530 |
| 2018/0363294 | A1 | * | 12/2018 | Galas | E04F 15/02044 |

* cited by examiner

PARTITION CLIP

CROSS-REFERENCE TO RELATED APPLICATION

This application claims the priority of U.S. Provisional Patent Application No. 62/461,959 filed on Feb. 22, 2017, the entirety of which is incorporated herein by reference.

BACKGROUND

This disclosure relates generally to T-bar exposed ceiling systems. More particularly, this disclosure relates to clips which are employed to interface with ceiling support structures within an interior enclosure.

Interior installations within a building typically employ a crossbar or T-bar system which is comprised of parallel T-bars which are joined to form a grid. Ceiling tiles are retained by flanges of the T-bars to support and form a ceiling. Commonly, it is desired to connect a member to the grid to provide a partition or various internal structures extending to the ceiling.

A conventional technique is to mount a clip over the T-bar to provide a ceiling connector for connecting a track, a stud or other partition structure. The latter is accomplished by raising the ceiling tile above the T-bar, placing the clip over the T-bar, fastening the clip to the T-bar and repositioning the ceiling tile. The clip then forms a connecting component for a partition structure.

A typical representative related prior art structure and an installation method are depicted in FIGS. 9A and 9B. Tiles on both sides of the T-bar must be raised above the T-bar to place the connector, the T-bar and then fasten the connection to the T-bar. For a given installation, numerous connectors or clips are typically employed.

A new and improved partition clip has an efficient construction, is easily positioned and installed, does not require tools or fasteners for initial installation and is installed to a T-bar without significantly lifting or removing one or more ceiling tiles.

SUMMARY

Briefly stated, the universal partition clip for attachment to a framing member T-bar comprises a member formed from sheet metal and extending from a first end to a second end. The member has four parallel bends which form an elongated bottom panel of uniform width, a pair of side panels generally perpendicular to the bottom panel and a pair of generally coplanar first and second lips spaced from the bottom panel. The lips define a longitudinal slot extending from the first end to the second end. A first resilient integral tab extends above the bottom panel from the first end toward the first lip. A second resilient integral tab extends above the bottom panel from the second end toward the second lip.

Each of the tabs preferably has a compound U-shaped configuration. The tabs are preferably substantially identical. The T-bar flange has opposed flange portions collectively defining a flange width. The tab proximally terminates to define a longitudinal spacing and the longitudinal spacing is greater than the T-bar flange width. The bottom panel uniform width is substantially equal to the T-bar flange width. The first and second tabs have portions which are disposed slightly above the first and second lips, respectively. The second resilient tabs each integrally connect with a side panel.

A universal partition clip for attachment to a framing member T-bar having opposed projecting flange portions collectively defining a flange width comprises a unitary member which extends from a first end to a second end. The unitary member has four generally parallel corners which form an elongated panel of uniform width and a pair of side panels generally perpendicular to the bottom panel and a pair of generally coplanar first and second lips spaced from the bottom panel. The lips define a longitudinal slot extending from the first end to the second end. A first resilient integral tab extends from or adjacent the first end toward the first lip and has portions disposed slightly above the first lip. A second resilient integral tab extends from or adjacent the second end toward the second lip and has portions disposed slightly above the second lip.

The tabs proximally terminate to define a longitudinal spacing and the longitudinal spacing is greater than the flange width of the T-bar. The bottom panel uniform width is substantially equal to the T-bar flange width. The first and second resilient tabs each integrally connects with a side panel. The clip is preferably formed from a single metal sheet.

The framing installation comprises a framing member T-bar having a medial upright portion and opposed projecting flange portions defining an underside. The universal clip is mounted to the T-bar at the underside. A member extends from a first end to a second end with four bends which form an elongated panel of uniform width spaced from the underside. A pair of generally parallel side panels generally perpendicular to the bottom panel and a pair of generally coplanar first and second lips engage the underside and define a longitudinal slot extending from the first end to the second end and receiving the upright. The first resilient integral tab extends from the first end toward the first lip and resiliently engages over a flange portion. A first resilient integral tab extends from or adjacent the first end toward the first lip and resiliently engages over a flange portion and a second resilient integral tab extends from or adjacent the second end toward the second lip and resiliently engages over the second flange portion.

Each said tab preferably has a compound U-shaped configuration and the tabs are substantially identical. The T-bar flange portions define a width. The tabs proximally terminate to define longitudinal spacing wherein the longitudinal spacing is greater than the width of the T-bar flange. The T-bar flange portions define a flange width. The bottom panel uniform width is substantially equal to the T-bar flange width. The clip is preferably an integral one piece member formed from a metal sheet.

DETAILED DESCRIPTION

Figure 1:
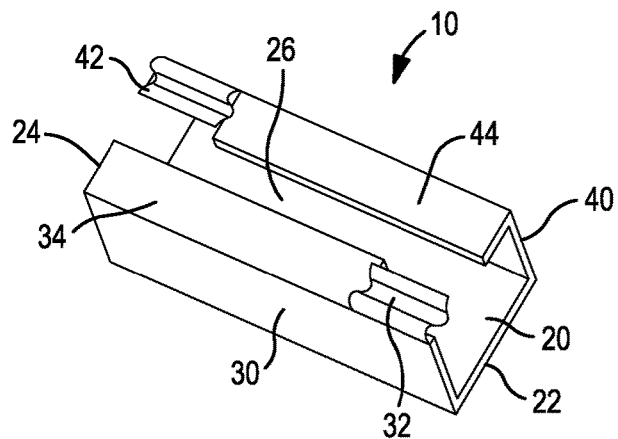
FIG. 1 is a perspective view of a partition clip.

With reference to the drawings wherein like numerals represent like parts throughout the several figures, a partition clip is generally designated by the numeral 10. Partition clip 10 is especially adapted for efficient installation to a T-bar 12 such as may be employed in a ceiling installation for construction of a grid to retain ceiling tile 14.

The clip 10 is a one-piece construction which is cut, folded and formed from a single piece of sheet metal. The clip can best be described as having a generally rectangular bottom surface 20 with opposed elongated sides 30 and 40 which have a quasi-slightly irregular rectangular form, as will be further described. The longitudinally spaced ends 22 and 24 of the clip are open. An upper longitudinal slot 26 extends between the open ends 22 and 24.

A pair of resilient retaining tabs 32 and 42 extend integrally at the top of sides 30 and 40, respectively, adjacent their open ends. The tabs preferably have a compound U-shaped configuration. The upper surface of the clip is longitudinally traversed for most of the length by opposed offset upper strips 34 and 44 of uniform longitudinal length l and of uniform transverse width T which are generally parallel to the bottom panel 20. The offset strips 34 and 44 longitudinally terminate prior to the respective tabs 32 and 42.

Figure 3:
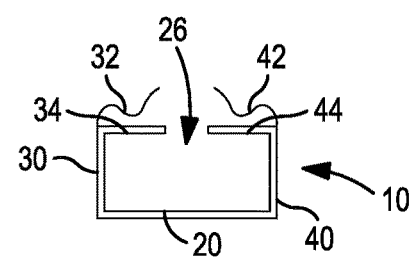
FIG. 3 is a right end view of the clip of FIG. 1.

The tabs are each spaced slightly above the height of the strips 34 and 44, as best illustrated in FIG. 3. It should be appreciated that the height of the strips 34 and 44 are each uniformly spaced from the bottom panel 20 at a height h and each of the respective tabs 32 and 42 are slightly spaced above the respective strips at height H and preferably extend longitudinally along the clip at a uniform height. The tabs 32 and 42 and strips 34 and 44 cooperate to slidably capture opposed longitudinally spaced retaining flanges 15 of the T-bar.

Figure 2:
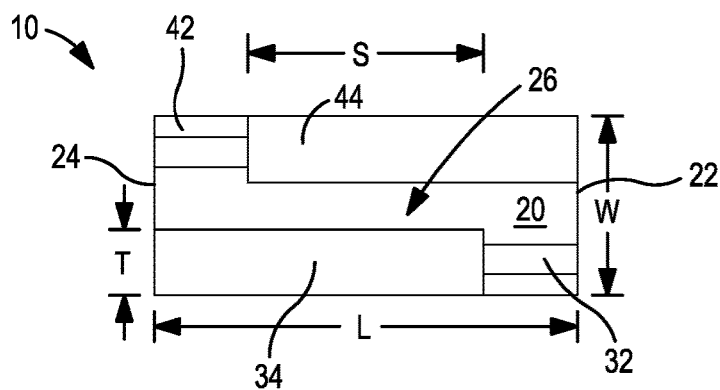
FIG. 2 is a top plan view, partly diagrammatic, of the clip of FIG. 1.
Figure 4:
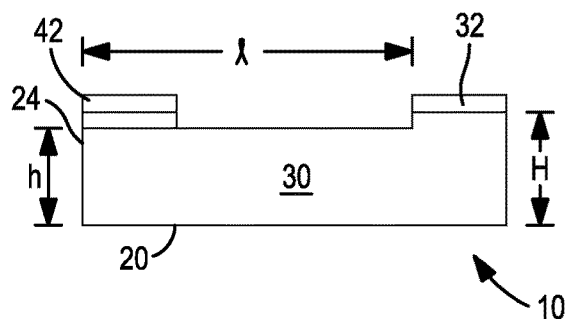
FIG. 4 is a front elevational view, partly diagrammatic, of the clip of FIG. 1.

With additional reference to FIG. 2, the spacing S between the proximal ends of the resilient tabs 32, 42 is greater than the distance D (FIG. 5) of the flange 15 extent of the T-bar 12. The effective height differential H-h between each of the resilient tabs and each strip is less than the thickness t (FIG. 5) of the T-bar flanges 15, or at least the extreme edge of the T-bar flanges when the clip is not mounted to the T-bar. Upon mounting, the tabs and strips resiliently engage opposed upper and lower surfaces of the retaining flange 15. The slot 26 has a sufficient transverse width to accommodate the upwardly projecting central stud 17 of the T-bar.

Figure 6:
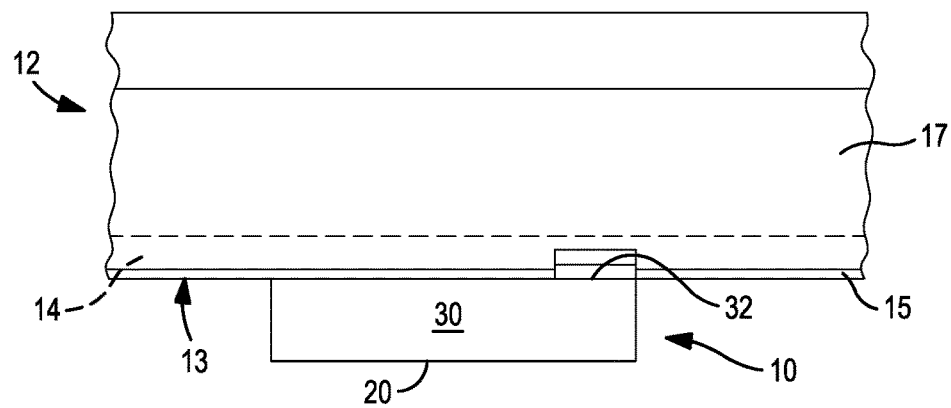
FIG. 6 is a fragmentary side elevational view of a T-bar and the clip of FIG. 4 upon completion of the installation process with a ceiling tile shown in phantom.
Figure 5:
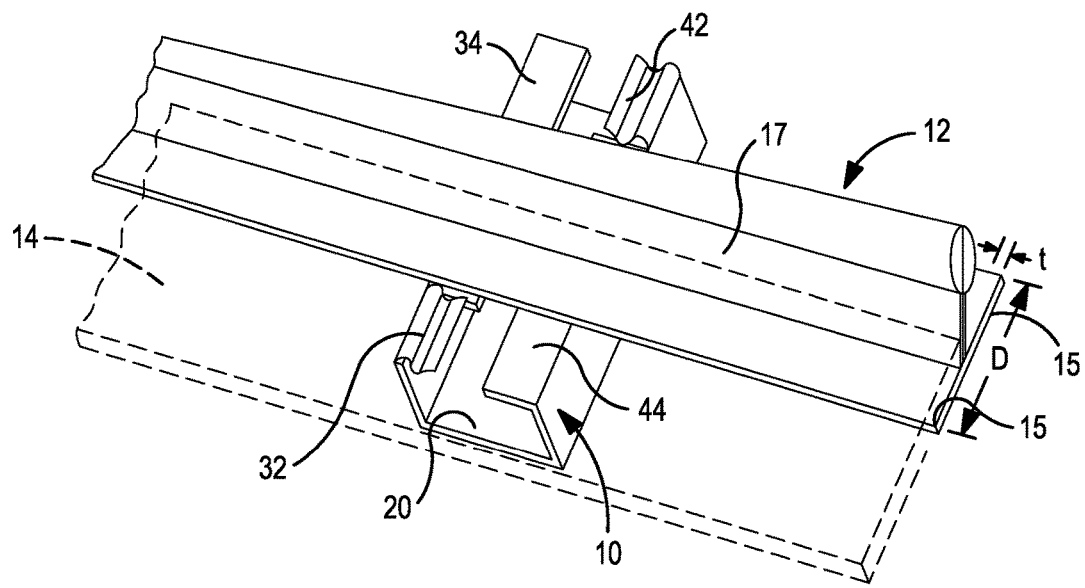
FIG. 5 is a perspective view of a T-bar and a partition clip of FIG. 1, viewed from above with ceiling tiles partly shown in phantom, partially in schematic, illustrating a step in the installation of the clip to the T-bar.

With additional reference to FIGS. 5 and 6, the clip 10 is easily mounted to the T-bar by contacting the top of the clip against the bottom 13 of the T-bar and the bottom surface of the adjacent ceiling tiles 14. The tiles 14 will be slightly upwardly displaced. In this regard, it is not necessary to significantly raise any ceiling tiles. The clip is then rotated so that the resilient tabs engage and slidably ride over the extreme flange portions 15 of the T-bar. The width W of the clip is generally commensurate with the distance D between the extreme edges T-bar flanges 15 so that when the clip is rotated, the sides 30 and 40 of the clip are generally positionable over the edge of each of the flanges of the T-bar and the lower portion of the stud is received in the upper slot 26.

Figure 7:
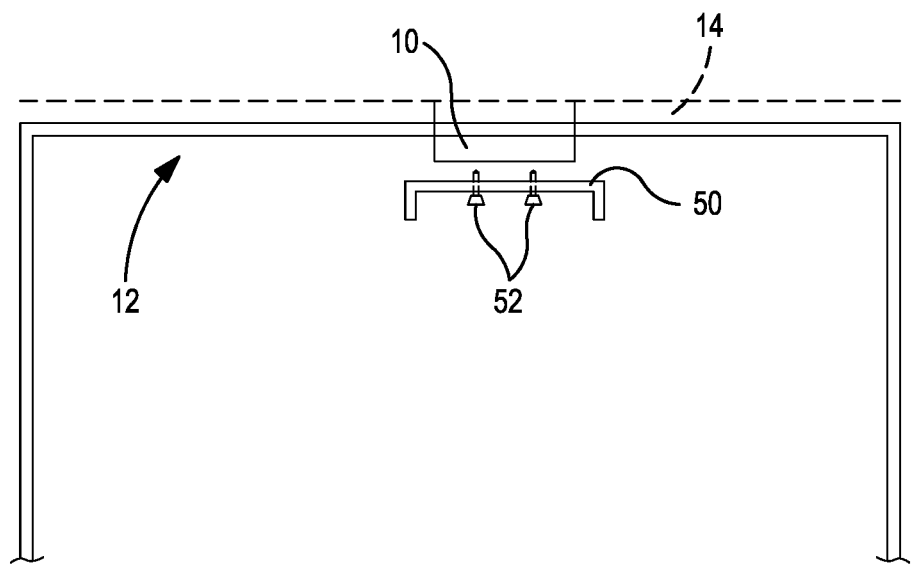
FIG. 7 is a perspective view, partially in broken lines, illustrating a representative installation for which the partition clamp has particular application.
Figure 8:
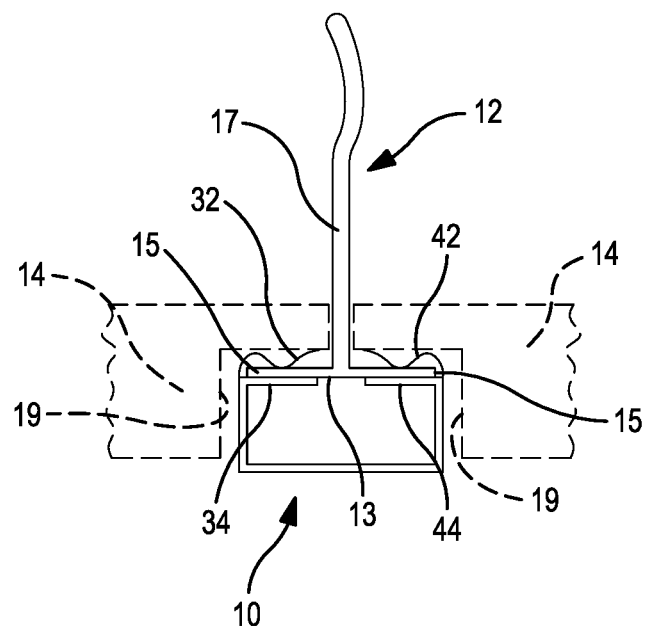
FIG. 8 is a transverse sectional view of a clip mounted to a T-bar and portions of ceiling tiles shown in phantom.
Figure 9A:
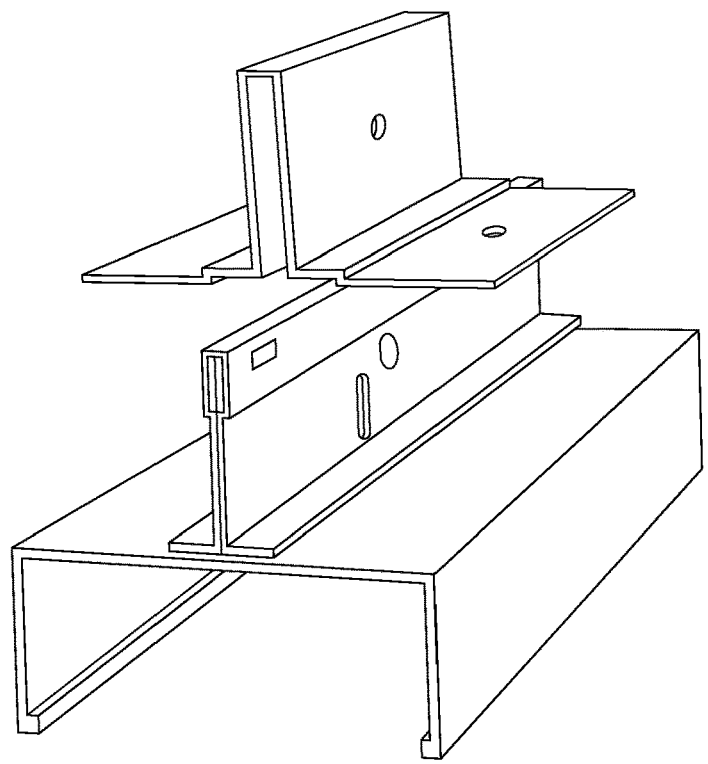
FIGS. 9A and 9B are perspective views depicting a representative prior art connector and installation method.
Figure 9B:
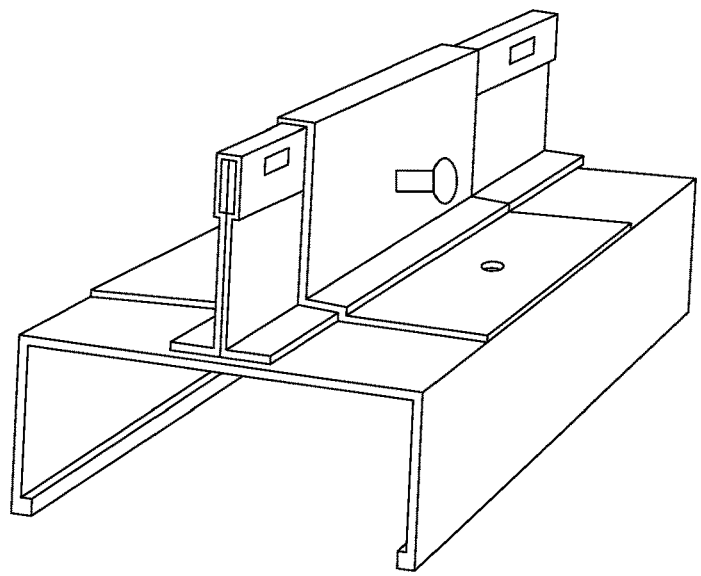

The tiles descend or fall to their finished installed position. For many installations, the tiles have a peripheral recess so that the lower central portion of each tile is suspended below the bottom of the T-bar flange. The sides 30, 40 of the clip are received between the edges 19 of the tile recesses (FIG. 8). The clip then presents a surface so that a track 50 or any other partition structure may be connected by fastener 52 to the clip (FIG. 7).

The width of the clips are consistent with the flange extent for covers bars or the T-bars. The length L of the clips is preferably 2½ inches or 3⅝ inches consistent with the dimensions of the engaging interface of the partition structures.

It will be appreciated that the clips may be mounted at a selective position and connected to the underside of the T-bar as required without requiring removal of the ceiling tiles and/or fastening at the central portion of the T-bar.

While preferred embodiments of the foregoing universal clip and resulting installation have been set forth for purposes of illustration, the foregoing description should not be deemed a limitation of the invention herein. Accordingly, various modifications, adaptations and alternatives may occur to one skilled in the art without departing from the spirit and the scope of the present invention.

The invention claimed is:

1. A universal partition clip for attachment to a framing member T-bar comprising:
   a member formed from sheet metal and extending from a first end to a second end with four parallel bends which form an elongated bottom panel of uniform width, a first side panel and a parallel second side panel each perpendicular to said bottom panel and a pair of coplanar first and second strips spaced from and entirely positioned directly above said bottom panel, said first strip perpendicular to and integrally extending from said first side panel toward second side panel, said second strip perpendicular to and extending from said second panel toward said first panel, said first and second strips at least partially defining a longitudinal slot extending from said first end to said second end; and
   a first resilient integral tab extending from a first side panel and above said bottom panel from said first end toward said first strip and a second resilient integral tab extending from a second side panel above said bottom panel from said second end toward said second strip.

2. The universal partition clip of claim 1 wherein each said tab has a compound U-shaped configuration.

3. The universal partition clip of claim 1 wherein said tabs are substantially identical.

4. The universal partition clip of claim 1 wherein the T-bar flange has opposed flange portions collectively defining a flange width and the tabs proximally terminate to define a longitudinal spacing and said longitudinal spacing is greater than the T-bar flange width.

5. The universal partition clip of claim 1 wherein said bottom panel uniform width is substantially equal to the T-bar flange width.

6. The universal partition clip of claim 1 wherein said first and second tabs have portions disposed slightly above said first and second strips, respectively.

7. A universal partition clip for attachment to a framing member T-bar having opposed projecting flange portions collectively defining a flange width comprising:

a unitary member extending from a first end to a second end with four parallel corners which form an elongated bottom panel of uniform width, and a first panel and a second side panel each perpendicular to said bottom panel and a pair of coplanar first and second strips spaced from and overlying said bottom panel and at least partially defining a longitudinal slot extending from said first end to said second end; and a first resilient integral tab extending from said first panel from or adjacent said first end toward said first strip and having portions disposed slightly above said first strip and a second resilient integral tab extending from said second panel and from or adjacent said second end toward said second strip and having portions disposed slightly above said second strip, said first and second tabs entirely overlying said bottom panel.

8. The universal partition clip of claim 7 wherein each said tab has a compound U-shaped configuration.

9. The universal partition clip of claim 7 wherein said tabs are substantially identical.

10. The universal partition clip of claim 7 wherein the tabs proximally terminate to define a longitudinal spacing and said longitudinal spacing is greater than the flange width of the T-bar.

11. The universal partition clip of claim 7 wherein said bottom panel uniform width is substantially equal to the T-bar flange width.

12. The universal partition clip of claim 7 wherein said first resilient tab integrally connects with the first side panel and said second resilient tab integrally connects with the second side panel.

13. The universal partition clip of claim 7 wherein said clip is formed from a single metal sheet.

* * * * *